United States Patent Office 3,090,341
Patented May 21, 1963

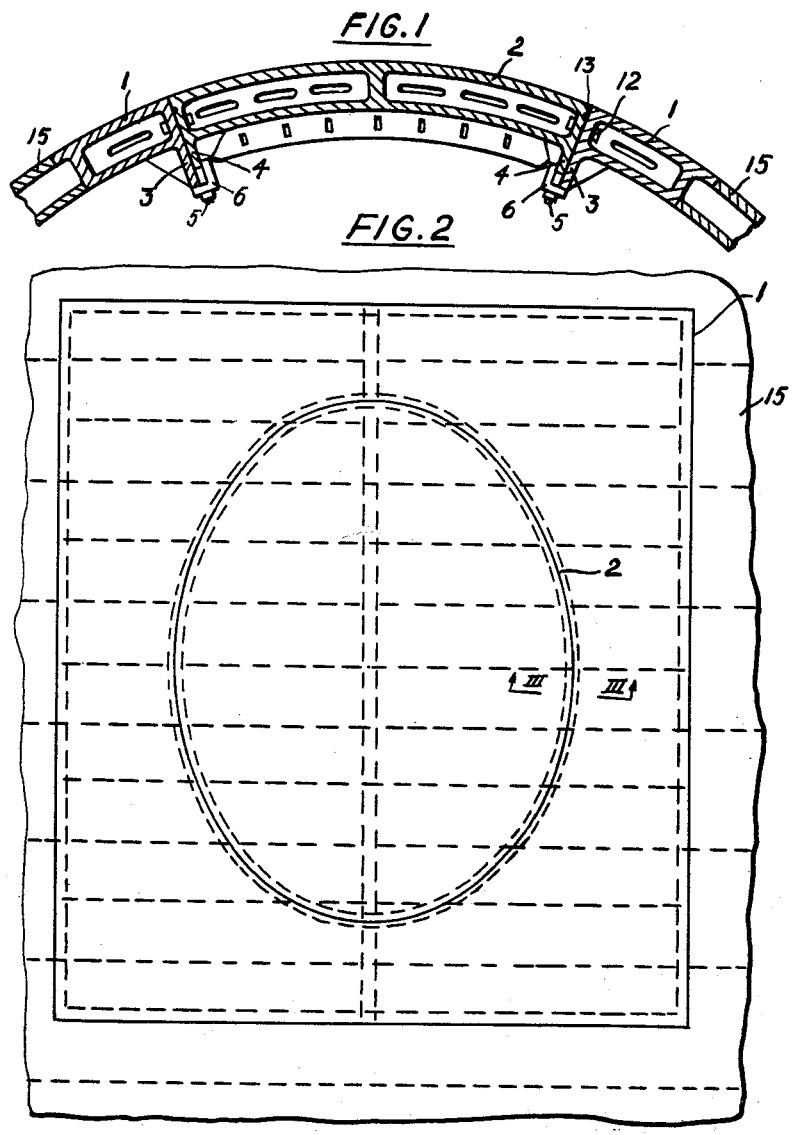

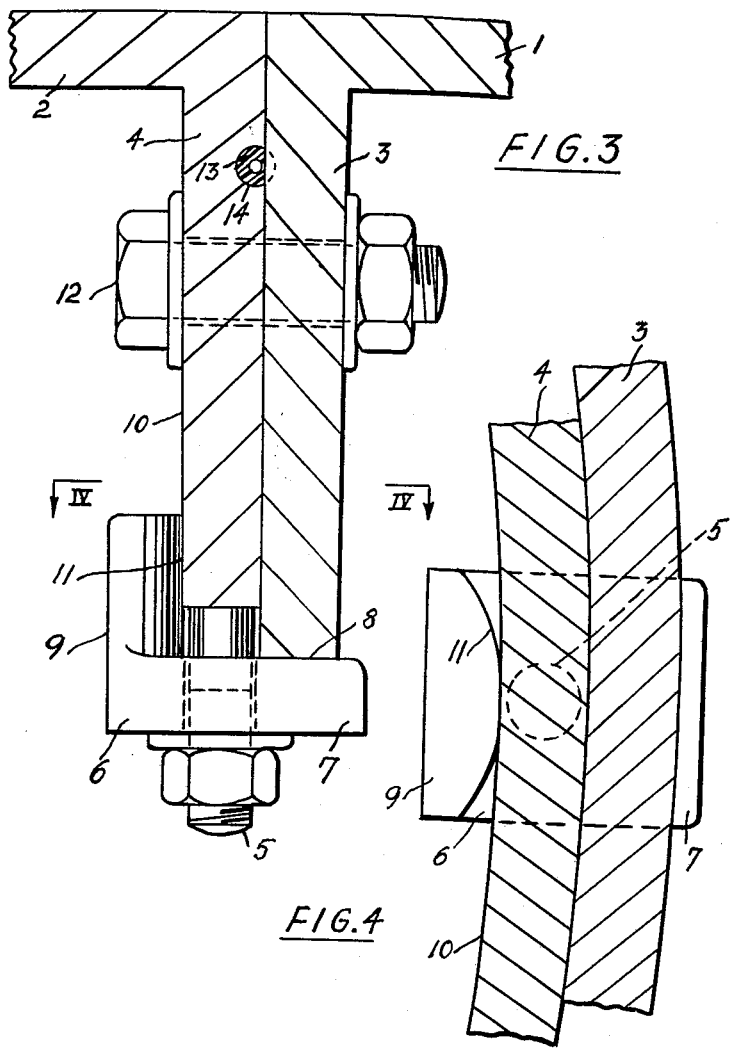

3,090,341
MOUNTING HATCH FOR SUBMARINE VESSELS
Karl Schröer, Trappenkamp via Neumunster, and Willy Bratumyl, Holzkoppel, Kiel, Germany, assignors to Kieler Howaldtswerke Aktiengesellschaft, Kiel-Dietrichsdorf, Germany, a firm
Filed Feb. 27, 1962, Ser. No. 176,077
Claims priority, application Germany Mar. 3, 1961
4 Claims. (Cl. 114—201)

This invention relates to hatches, and more specifically to a mounting hatch for submarine vessels such as is required for mounting and dismounting, especially for repairing purposes, engines and other equipment.

Mounting hatches which are connected to the hull of the vessels by means of screws or rivets are known. These mounting hatches, however, easily become untight when high static pressures occur in the submarine vessels. When the hull of the vessels is subjected to pressure or suction waves caused e.g. by mines, the screw or rivet heads easily break off and it is not possible to seal the leaks again while the vessels are travelling under water.

It is also known to weld flanges into an opening in the hull of a vessel and to screw on a cover having a flange. However, this arrangement does not provide the possibility of a readjustment. Moreover, by welding the flanges into the opening, the high-quality steel hull of the vessel may be distorted and cracks may be caused. Subsequent work and exact fitting of the cover can only be carried out on the hull itself and thus requires expensive machines.

Often no mounting hatch is provided in the hull of the vessel when the latter is being newly constructed and the hull must be cut open for dismounting a driving engine or the like. After the driving engine is mounted again, the opening cut into the hull is closed by welding, whereby considerable tensional forces are caused which reduce the strength of the hull.

It is the object of the present invention to overcome these disadvantages and to provide a mounting hatch which is completely tight even when subjected to heavy shocks, includes means for adjustment and readjustment, and can be finished in the workshop on the lathe or a boring machine.

This object is achieved according to the invention by providing a mounting hatch for submarine vessels which comprises a frame having an opening and adapted to be welded into the substantially tubular hull of a vessel while the latter is being constructed, a cover inserted in the opening of the frame, the frame providing a seat for the cover and the seat of the frame and the cover being worked in the workshop to fit each other at their engaging sealing surfaces, and a connection provided between said seat of the frame and said cover and adjustable from the interior of the vessel.

The frame is welded into the hull while the latter is being welded together in order to avoid the occurrence of edge stresses.

The seat in the frame and the cover may be provided with inwardly directed flanges and the seat and the cover may continuously decrease in diameter towards the interior of the vessel. The adjustable connection may be arranged on the flanges.

In an expedient embodiment of the invention, the seat may be formed by a circular opening in the frame, the cover may be of circular, curved configuration and inserted in the circular opening and the seat and the edge of the cover may conically narrow towards the interior of the vessel.

A reliable and adjustable connection and seal capable of resisting even heavy shocks may consist of screws secured in the flange of the cover and projecting into the interior of the vessel, and angle plates tightenable on the screws and each having a leg guided on the screw and bearing against the free end of the flange of the frame, said flange being longer than the flange of the cover, and a bent-off leg slidably guided on a surface of the flange of the cover remote from the sealing surface.

The bent-off leg of the angle plate expediently has a curved portion on its side facing the flange of the cover to obtain a line contact on said flange for sliding movement thereon.

According to a further feature a groove may be arranged between the flanges of the frame and the cover in one of the flanges in spaced relationship from the outer side of the hatch and a sealing ring may be inserted, preferably glued, in the groove.

A preferred embodiment of the invention will now be described by way of example and with reference to the accompanying drawings, in which:

FIG. 1 is a vertical cross-section through a mounting hatch according to the invention;
FIG. 2 is a top plan view thereof;
FIG. 3 is a vertical section on the line III—III of FIG. 2; and
FIG. 4 is a horizontal section on the line IV—IV of FIG. 3.

FIGS. 1 and 2 show a mounting hatch for submarine vessels and comprising a frame 1 having an opening and adapted to be welded into the substantially tubular hull 15 of a vessel while the latter is being constructed, and a cover 2 inserted in the opening of the frame, the frame providing a seat for the cover and the seat of the frame and the cover being worked in the workshop to fit each other at their engaging sealing surfaces. The frame 1 and the cover 2 are initially made in one piece and the cover 2 is cut out of this piece. Thereafter inwardly directed flanges 3 and 4 may be welded to the seat of the frame 1 and to the cover 2, respectively, and turned true to gauge. The flanges 3 and 4 taper towards the interior of the vessel and the opening in the frame 1 and the cover 2 continuously decrease in diameter towards the interior of the vessel.

As shown especially in FIG. 3, the flange 3 of the frame 1 is longer than the flange 4 of the cover 2 to permit the flange 4 to be tightened. Screws 5 projecting into the interior of the vessel are secured in the flange 4 of the cover 2 and distributed over the circumference thereof and serve each to tighten and adjust the flange 4 with the aid of an angle plate 6. The angle plate 6 has a leg 7 and a bent-off leg 9 projecting from the leg 7 in the direction of the hull of the vessel. The leg 7 bears against the lower end 8 of the flange 3 and is guided on the screw 5 so that it can be tightened. The bent-off leg 9 of the angle plate 6 bears against the surface 10 of the flange 4 remote from the sealing surface and is slidably guided thereon.

The bent-off leg 9 of the angle plate 6 is, as shown in FIG. 4, expediently formed with a curved portion 11 to ensure a line contact between the surface 10 of the flange 4 and the leg 9 when the latter slides on the surface 10.

FIGS. 1 and 3 show screws 12 for connecting the flanges 3 and 4. A sealing ring 13 is inserted between the flanges 3 and 4 in a groove 14 in one of the flanges and expediently glued therein.

When shocks occur to which the submarine vessel is subjected, the cover 2 can be retightened in a simple and reliable manner without damage to the sealing ring 13.

We claim:
1. A mounting hatch for submarine vessels, comprising a frame having an opening and adapted to be welded into the substantially tubular hull of a vessel while the latter is being constructed, a cover inserted in the opening of the frame, the frame providing a seat for the cover and the seat of the frame and the cover being worked in the workshop to fit each other at their engaging sealing surfaces, inwardly directed abutting flanges on the frame and cover with the flanges of the frame being longer than the flanges on the cover, and a connection provided between said frame and cover and adjustable from the interior of the vessel, said adjustable connection including screws carried by the inner edges of the cover flanges and projecting into the interior of the vessel, angle plates for each pair of flanges and each angle plate having one leg engaged with the adjacent screw and underlying the longer flange on the frame and the other leg engaged with the adjacent side of the cover flange.

2. A mounting hatch as claimed in claim 1, wherein a curved portion is formed on the side of each angle plate that faces the flange of the cover to obtain a contact between the surface of the flange of the cover remote from the sealing surface for sliding movement of the leg on said surface of the flange of the cover.

3. A mounting hatch as claimed in claim 1, wherein a groove is arranged between the flanges of the frame and the cover in one of the flanges in spaced relationship from the outer side, and a sealing ring is inserted in said groove.

4. A mounting hatch as claimed in claim 3, wherein the sealing ring is glued in the groove.

References Cited in the file of this patent

UNITED STATES PATENTS 2,760,670     Moore _____ Aug. 28, 1956